United States Patent [19]

Iizuka et al.

[11] Patent Number: 5,699,521

[45] Date of Patent: Dec. 16, 1997

[54] COMMUNICATION SYSTEM AND COMMUNICATION METHOD

[75] Inventors: Tamio Iizuka; Koichiro Sakuraba; Kouji Kamoshida, all of Hitachi; Yoshiaki Adachi, Hitachioota, all of Japan

[73] Assignee: Hitachi, Ltd., Tokyo, Japan

[21] Appl. No.: 408,746

[22] Filed: Mar. 22, 1995

[30] Foreign Application Priority Data

Mar. 30, 1994 [JP] Japan .................................. 6-060560

[51] Int. Cl.⁶ ...................................................... G06F 13/00
[52] U.S. Cl. ............................... 395/200.15; 395/200.13; 370/455
[58] Field of Search ....................... 395/200.15, 800, 395/260.03, 240.11, 831, 260.13; 370/412, 455

[56] References Cited

U.S. PATENT DOCUMENTS

| 4,272,819 | 6/1981 | Katsumata et al. | 395/842 |
| 4,500,987 | 2/1985 | Hasegawa | 370/60 |
| 5,033,077 | 7/1991 | Bergeron et al. | 379/67 |

FOREIGN PATENT DOCUMENTS

| 63-287231A | 11/1988 | Japan . |
| 4-180425A | 6/1992 | Japan . |

OTHER PUBLICATIONS

Sidnie Feit et al, "TCP/IP Architecture, Protocols, and Implementation"; McGraw-Hill, Nov. 19, 1992, pp. 89–121.

Robert M. Hinden, "Simple Internet Protocol Plus White Paper", Internet-Draft, Sun Microsystems, Feb. 1, 1994 pp. 1–23.

*Primary Examiner*—Mehmet B. Geckil
*Attorney, Agent, or Firm*—Kenyon & Kenyon

[57] ABSTRACT

A communication system and communication method having protocols used are to priorly process real-time data without delay. Information of a protocol header of data to be sent or received is used as priority decision information to decide whether or not the data should be priorly send- or receive-processed. The information to be priorly processed of combination of the priority decision information is registered and managed as priority data information before being stored. The data send or receive process fetches the priority decision information from the send or receive data before deciding whether or not the data are registered as the priority data information. If so, the data are send- or receive-processed prior to the data that are not registered. The communication system and communication method can priorly control the data to be processed in real time without limiting communications for each of the data treated by an application communication program even if the real-time data are mixed with non-real-time data.

17 Claims, 12 Drawing Sheets

| PROTOCOL TYPE ⌒1001 | IP UPPER PROTOCOL ⌒1002 | SOURCE INA ⌒1003 | DESTINATION INA ⌒1004 | SOURCE PORT NUMBER ⌒1005 | DESTINATION PORT NUMBER ⌒1006 | PRIORITY PROCESS LEVEL ⌒1007 |
|---|---|---|---|---|---|---|
| 〃 | 〃 | 〃 | 〃 | 〃 | 〃 | 〃 |
| 〃 | 〃 | 〃 | 〃 | 〃 | 〃 | 〃 |

⌒1000

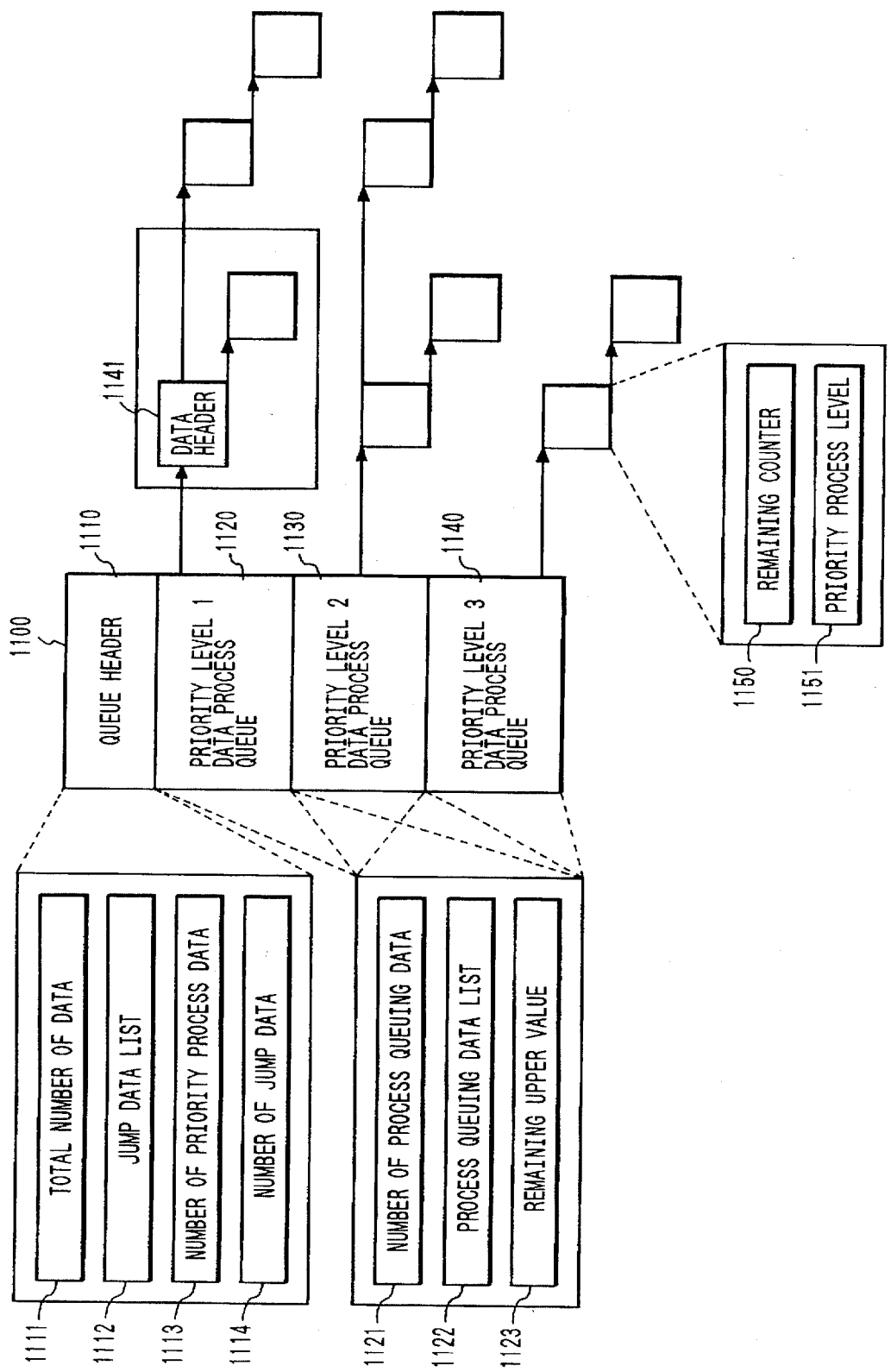

COMMUNICATION SYSTEM AND COMMUNICATION METHOD

BACKGROUND OF THE INVENTION

The present invention relates to a communication system and communication method. More particularly, it concerns a communication system and communication method useful for communications of multimedia data, such as sound and video data, and urgent plant data of unallowable delay, the communications having mixed data some of which needs to be processed in real time and some of which may be delayed to some degree.

Prior communication systems have used protocols, such as the TCP (Transmission Control Protocol)/IP (Internet Protocol) of the DARPA (Defense Advanced Research Project Agency) and the OSI (Open Systems Interconnection) protocol of the ISO (International Standards Organization). End users of the prior communication systems have demanded that the systems be able to communicate data in real time even if data of allowable delay coexist with data of unallowable delay, such as multimedia data and urgent plant data required to process in real time. As an example, the Japanese Patent Application Laid-Open No. 4-180425 disclosed a priority control method according to the information of receive data process order. According to that method network addresses of destination terminals are made to correspond to destination processes. As another example, the Japanese Patent Application Laid-Open No. 63-287231 disclosed a decision method that takes a notice of length of the data received in an internet repeater to decide whether the data should be priorly processed or not. However, the prior communication systems do not take into account a priority control that should be made for each communication program or service of the applications having the same protocol used therein. Also, the prior communication systems do not take into account a priority control for each destination party even if using the same communication program.

Further, the prior communication systems do not take into account setting a priority process level depending on a real-time degree for each of the data treated by the communication program of an application.

Still further, the prior communication systems are less workable in designing and building.

Still further, the prior communication systems do not take into account a priority control of the communication system that is configured of a plurality of networks connected by internet repeaters among communicating terminals.

Still further, the prior communication systems do not take into account prevention of congestion of the communication network due to frequent re-send process and disconnection of the logic line. These difficulties are caused by the fact that continuous priority data interrupt the send and receive processes of nonpriority data, resulting send time-out at a data send terminal.

SUMMARY OF THE INVENTION

In view of solving the foregoing problems of the prior art the present invention provides a communication system and communication method that achieve a priority control without limiting a communication for each of the data treated by the communication program of an application.

The present invention also provides a communication system and communication method that can avoid impossible communication where there is less buffer for data at high priority process level than the ones at low priority process level and that can minimize communication delay due to a re-send process.

The present invention further provides a communication system and communication method that can achieve a priority control for a communication system containing internet repeaters.

The present invention further provides a communication system and communication method that can prevent congestion of the communication network and disconnection of the logic line without putting low-priority data in a starvation situation even if high-priority data process continue.

In accordance with aspects of the present invention a communication system is such that a data send or receive process order is decided for each data from priority decision information of the send or receive data and priority data information registered in advance. In particular, the communication system having a plurality of terminals connected through communication networks and using protocols for sending or receiving data, comprises: means for making use of priority decision information for deciding the data to be subjected to prior send or receive process as protocol header information in the send or receive data; registering means for registering priority decision information of the data sent or received previously among the priority decision information in advance as priority data information; deciding means for fetching priority decision information from the send or receive data in the data send or receive process deciding whether or not the data are registered as the priority decision information; and, sending or receiving means for making the send or receive process of the data registered as the priority decision information prior to unregistered data.

In accordance with further aspects of the present invention the communication system has send or receive data that has priority process levels set in priority data information thereof before a send or receive process is made depending on the priority process level. In particular, the communication system having a plurality of terminals connected through communication networks and using protocols for sending or receiving data, comprises: means for making use of priority decision information for deciding the data to be subjected to prior send or receive process as protocol header information in the send or receive data; means for registering priority decision information of the data sent or received previously among the priority decision information in advance as priority data information, the priority decision information having a priority process level added thereto as priority process order; deciding means for fetching priority decision information from the send or receive data before deciding whether or not the data are registered as the priority decision information, the data being processed to send to or received from the communication network; and, means for making priority control of send or receive process of the registered data at the registered priority process level of the priority data information or unregistered data at a priority process level registered in advance.

In accordance with yet further aspects of the present invention by the communication system has a plurality of communication networks connected therein in which data to be sent or received are segmented to a transmission data size of a source or destination communication network, have a data segment identifier added thereto, have a priority made to correspond to the data segment identifier, and are priority controlled on the basis of the priority made to correspond to the data segment identifier. In particular, the communication system having a plurality of terminals connected through communication networks and using protocols for sending or receiving data, comprises: send data segmenting means for segmenting the send data into at least leading data and second and following data; means for storing priority decision information into a protocol header of each of the segmented data; priority deciding means for deciding whether the received data are prior ones or not by use of priority decision information of a protocol header of the segmented leading data; table storing means for storing a table having data segment identifiers of headers of receive data made to correspond to priority or not; table decision means for deciding with the table whether or not the data segment identifier of the received second or the following segmented data is prior; and, means for priority-controlling a send or receive process depending on decision results of the table decision means.

In accordance with further aspects of the present invention in the communication system if the data to be priority-controlled occur certain times consecutively or if the data of lower priority are not processed in certain time since their occurrence, the data of lower priority are processed to a degree at which process of the data of higher priority is not affected. In particular, the communication system has means for registering upper limit numbers of times in which the data to be priority-processed can continuously send- and receive-processed; integrating means for integrating number of times of consecutive priority send or receive processes since occurrence of a send or receive process request of data to be nonpriority-processed; means for deciding whether or not the number of times of the consecutive priority send or receive processes integrated by the integrating means is the register upper limit number of times; and, means for making prior send or receive process of a registered number of the queuing nonpriority data for more than the upper limit number of times. Instead of the upper limit number of times, upper limit time for which data to be send- or receive-processed can remain in the system. Alternatively, we can register upper limit time of the data to be send- or receive-processed by level for which the data can remain in the system.

The present invention decides the send or receive process orders of send or receive data with priority decision information of the data and priority data information registered in advance in the communication system having mixed data of such data as multimedia and plant data required to process in real time and data that may be delayed in some degree. This feature allows the data to be priority-controlled without providing limits of communication for each of the data treated by application communication programs.

Also, the present invention sets priority process levels of the data to be sent or received in the priority data information before making the priority process depending on the priority process level. This feature allows the data to be weighted to assure real-time process without limiting the communication.

Further, the present invention has a priority process order decided in a data send process stored priority information of a protocol of the data before priority-controlling the data send or receive process according to the information. The present invention decides priorities of data from priority decision information of a protocol of the data at the time when segmented data are sent or received, has a table having the priorities made to correspond to data segment identifiers of the data, and obtains the priority corresponding the identifier of the data to make priority control when the segmented data are received. This feature allows the priority control even for the data having no service identifier in the protocol header of the data. The data having no service identifier can be used by the internet repeaters connecting a plurality of networks and terminals.

A protocol header of the data has priorities of priority data and nonpriority data stored in a priority information thereof and the data send or receive process is priorly controlled according to the priority information.

Still further, the present invention can process the data of lower priority processed to a degree at which process of the data of higher priority is not affected if the data to be priority controlled occur certain times consecutively or if the data of lower priority are not processed in certain time since their occurrence. This feature can avoid congestion of the communication network due to unnecessary re-sending process and disconnection of the logic line since the send and receive processes of lower priority data that cannot be interrupted completely even with high priority data occurring continuously.

Various further and more specific features and advantages of the present invention will appear from the description given below.

BRIEF DESCRIPTION OF THE DRAWINGS

FIG. 11 is a configuration illustrating a send or receive process queue configuration of the third embodiment.

DETAILED DESCRIPTION

The following describes in detail embodiments of the present invention by reference to the accompanying drawings.

Overall Configuration of the System

Figure 2:
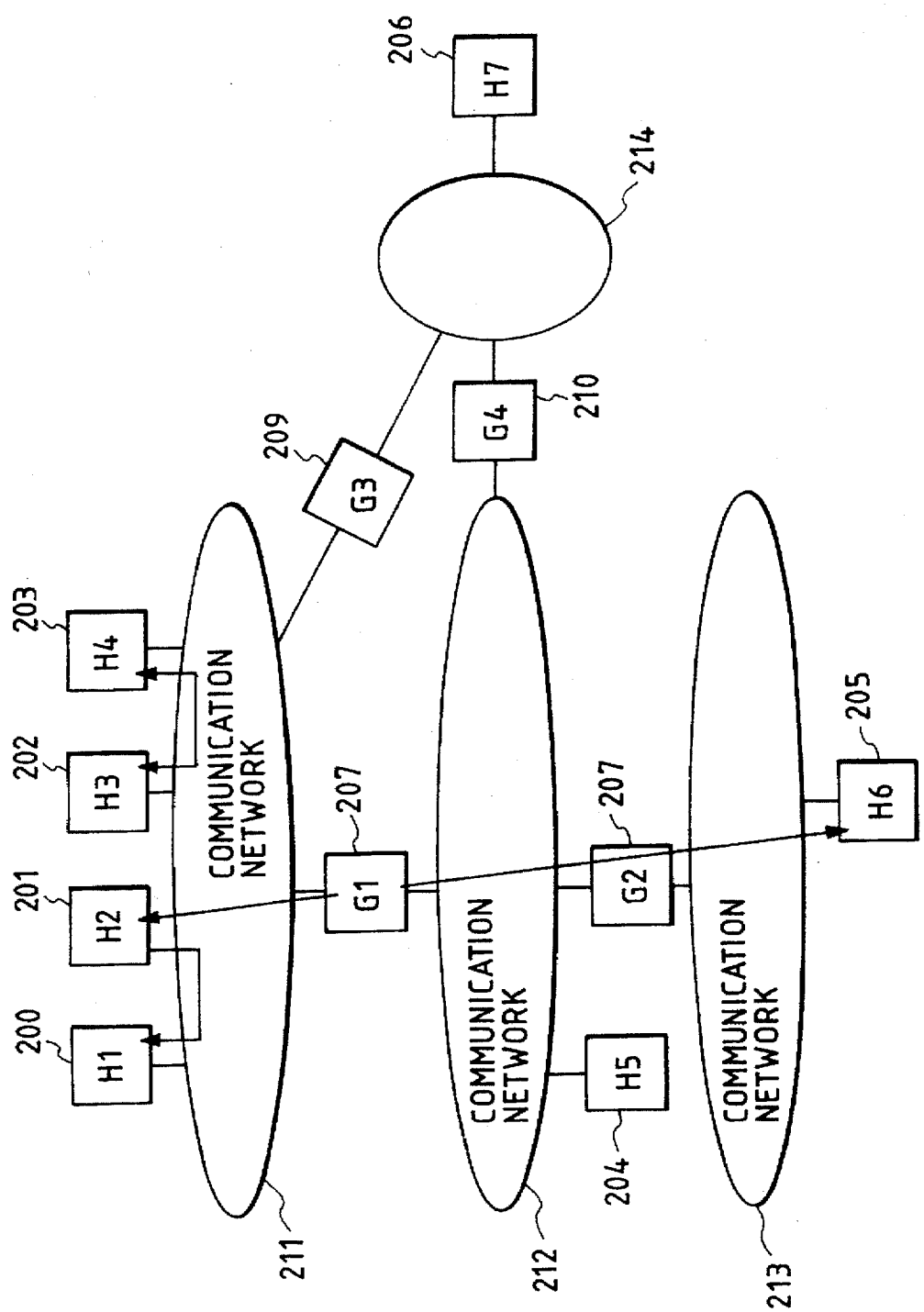
FIG. 2 is a view illustrating an overall circuit configuration for the communication system of the present invention.

First, FIG. 2 depicts a view illustrating an overall circuit configuration for the communication system of the present invention. A plurality of standard communication networks 211 to 214, such as LAN and WAN, have a plurality of terminals 200 to 206 connected thereto. The communication networks 211 to 214 are interconnected through network repeaters 207 to 210. Each of the terminals and repeaters has a world standard or industry standard communication protocol packed therein. It also has a network address defined by the network assigned thereto. The terminal has a communication program installed therein. The communication program proceeds with operations for the entire system while allowing the terminals to transmit and receive data thereamong. A data send request from the communication program or a data reception from the communication network is sent to another communication network through the communication protocol packed in the terminal before being passed to another communication program. Data are sent from the communication program of a terminal to another terminal through the repeaters of the networks.

A terminal to which data are to be sent is made to correspond by an OSI reference model before being decided by a network address defined by a network layer protocol. A process to which data are to be sent by a destination terminal is made to correspond by the OSI reference model before being decided by a destination service identifier defined by a transport layer protocol.

As an example, the following description assumes the communication system having the TCP, UDP, or IP used as protocol by the DARPA. The TCP and IP of the DARPA protocols has a network address used as a service identifier as port number. The communication program of a terminal should use either communication method of connection or datagram to communicate data with a communication program of another terminal. The terminal should enter an internet address and a port number of a destination terminal to connect with the destination terminal and communication program logically. The destination terminal to answer should identify the calling internet address and port number to decide the calling terminal and communication program. If the communication is of connection type and connection is made, the called terminal should ordinarily decide the calling internet address, destination internet address, calling port number, and destination port number. If the communication is of datagram type, the called terminal should decide them in units of data.

EMBODIMENT 1

Configuration

This and following paragraphs describe a first embodiment of the present invention.

Figure 1:
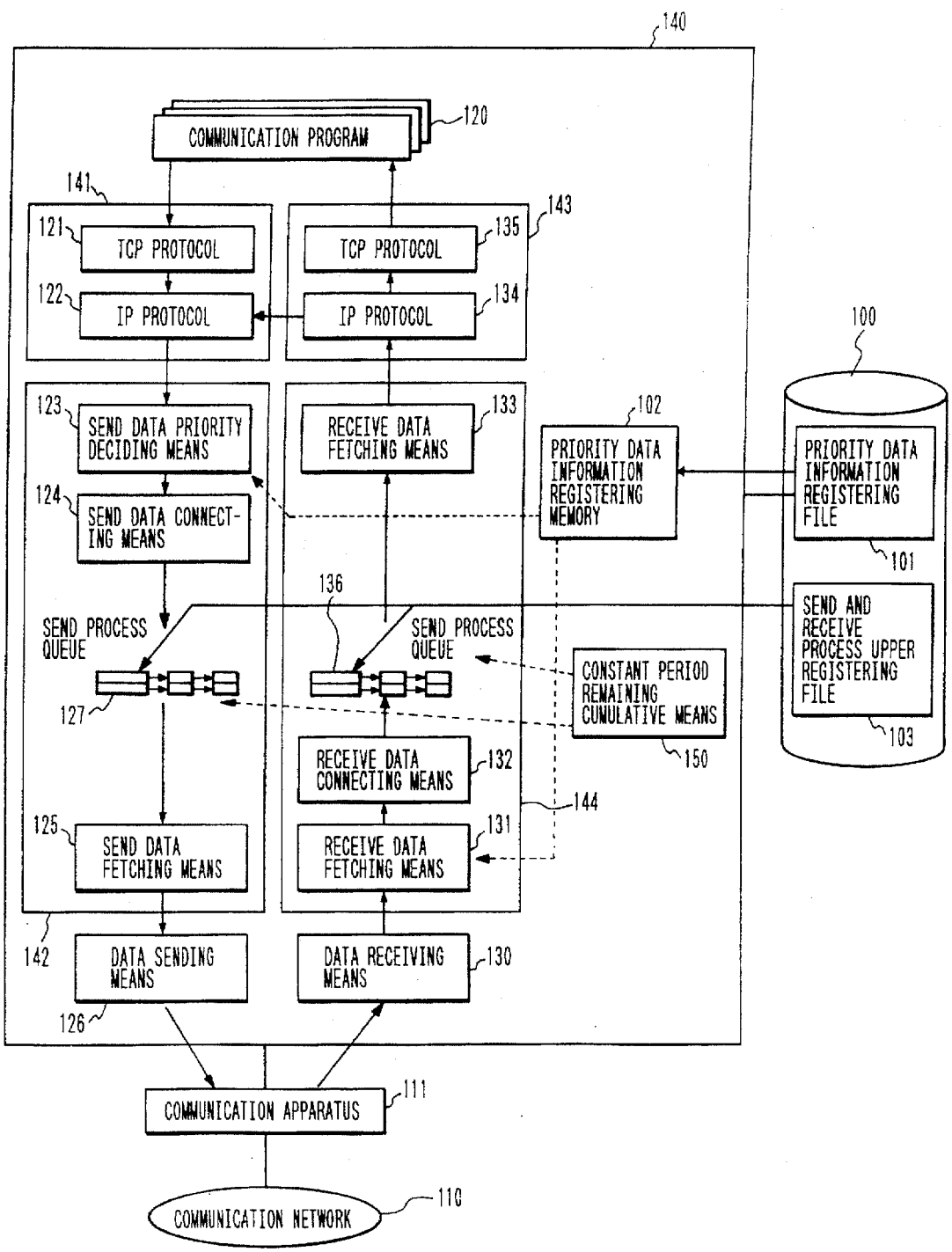
FIG. 1 is a block diagram illustrating a configuration for a priority communication control method of the communication system of the present invention.

FIG. 1 depicts a block diagram illustrating a configuration for a priority communication control method of the communication system of the present invention. A terminal 140 in the communication system comprises a communication program 120 for processing business in the communication system, a protocol send processing section 141, a protocol receive processing section 143, a data sending means 126 for sending data to the communication network through a communication apparatus 111, a data receiving means 130 from the communication network, a send data process queuing control section 142, and a receive data process queuing control section 144. The protocol send processing section 141 comprises a TCP protocol 121 and an IP protocol 122. The protocol receive processing section 143 comprises an IP protocol 134 and a TCP protocol 135. The send data process queuing control section 142 comprises send data priority deciding means 123 for deciding whether data should be processed or not, a send process queue 127, a send data connecting means 124 to connect the send process queue 127, and a send data fetching means 125 for fetching data from the send data connecting means 124. The receive data process queuing control section 144 comprises a receive data fetching means 131 for deciding whether data should be processed or not, a receive data connecting means 132 to connect the receive process queue 136, and a receive data fetching means 133 for fetching data from the receive data connecting means 132. An auxiliary storage 100 further has a priority data information registering file 101 for storing priority data information therein. A main memory has a priority data information registering memory 102 and a send and receive process upper registering file 103 put therein to inform to a send data priority deciding means 123 or a receive data fetching means 131 the priority data information that should be sent or received at high priority.

The priority data registered in the priority data information registering file 101 are formed of a type of communication program stored in the data, an address and source port number of a TCP header, an address of an IP header, and a source network address. The priority data are used as priority decision information to decide whether or not the send or receive data should be sent or received. The priority data information registering file 101 is set when the communication system is set up. The priority data information registering file 101 is stored and managed in the priority data information registering memory 102 in the main memory when the system is started up. The priority data information in the auxiliary storage 100 should not be stored in all the terminals and network repeaters, but a priority data management server may be provided in the system and the other terminals and network repeaters should be made to issue a communication request to fetch into the priority data information registering memory 102 thereof when they are started up. The priority data information may be allocated statically or dynamically undergo addition, change, or deletion.

The network repeater is ordinarily formed as the terminal although it may not have the communication program 120, the TCP protocol 121, and the TCP protocol 135. Note that the network repeater should be connected with more than two networks and more than two terminals and should have a function of repeating the data received from a network to another network.

The communication system has external data entered from a terminal in the communication network 110. The data are transferred and processed from a communication apparatus 111 through the data receiving means 130, the receive data fetching means 131, the receive data connecting means 132, the receive process queue 136, and the receive data fetching means 133, the IP protocol 134, the TCP protocol 135, and the communication program 120 in this order. The results processed in the communication system are processed through the communication program 120, the TCP protocol 121, the IP protocol 122, the send data priority deciding means 123, the send data connecting means 124, the send process queue 127, the send data fetching means 125, the data sending means 126, and the communication apparatus 111 before being fed out.

The communication program of a terminal in the system feeds data out to flow in the communication network. The data are sent to a communication program on the reception side in the same procedures as the input ones for the destination terminal. If there is an internet repeater, however, the data are entered from the terminal in the communication network 110 and transferred and processed from the communication apparatus 111 through the data receiving means 130, the receive data fetching means 131, the receive data connecting means 132, the receive process queue 136, and the receive data fetching means 133, the IP protocol 134, the IP protocol 122, the send data priority deciding means 123, the send data connecting means 124, the send process queue 127, the send data fetching means 125, the data sending means 126, and communication apparatus 111 in this order before being fed out to the destination terminal in the communication network 110.

Send Process

The following describes a process for sending data from the communication program to the communication network by reference to FIG. 1. The data sent from the communication program 120 has the TCP header added thereto by the TCP protocol 121 of the protocol send processing section 141. The data also has the IP header added thereto by the IP protocol 122. The send data priority deciding means 123 checks the information of the protocol header of the data to decide whether or not priority is given to the data to send. The send data connecting means 124 connects the data to either of the priority data process queue of the send process queue 127 or the nonpriority data process queue. If no data are connected to the send process queue 127 and if the data sending means 126 does not request data send to the communication apparatus 111, the data are directly passed to the data sending means 126 without connecting the data to the send process queue 127. The data sending means 126 adds to the send data the data link layer header or the MAC header if the data are sent to the LAN before starting the communication apparatus 111 to send the data to the communication network 110.

The data sending means 126 requests the data to the communication apparatus 111. If the send process queue 127 has no data connected thereto or if the send process queue 127 has the data connected thereto, the data are connected to the send process queue 127. If the data sending means 126 ends the current process of the send request to the communication apparatus 111 and receives the termination interrupt from the communication apparatus 111, the send data fetching means 125 fetches the data to be sent next from the send process queue 127 before requesting the communication apparatus 111 to send the data. Quantity of the data that the send data fetching means 125 can fetch is the one that the communication apparatus 111 can accept. That is, the send process queue 127 can accumulate data for a period of time while the communication apparatus 111 sends to the communication network 110 the data requested from the data sending means 126 to end. Then, the send data fetching means 125 fetches priority data in sequence to send when the data sending means 126 runs to send the data to the communication network.

Receive Process

The following describes a process for receiving data from the communication network to pass the data to the communication program by reference to FIG. 1. If the communication apparatus 111 receives the data from the communication network 110, the communication apparatus 111 reports interrupt to the data receiving means 130. The data receiving means 130 fetches the data from the data receiving means 130. The receive data fetching means 131 checks information of the protocol header of the data to determine whether or not the data should be received at high priority. The receive data connecting means 132 connects the data to either of the priority data process queue of the receive process queue 136 or the nonpriority data process queue. If the receive process queue 136 has no data connected thereto, the protocol receive process section 143 is started before the receive process by the serial interrupt report is ended. If the receive process queue 136 has the data connected thereto, the receive process is ended at once. When the protocol receive processing section 143 is started, the receive data fetching means 133 fetches one of the high priority data to be processed next from the receive process queue 136. The receive data fetching means 133 then passes the data to the IP protocol 134. If the data are destined to that terminal, the data are passed to the communication program 120 through the higher TCP protocol 135.

If the IP protocol 134 decides that the data are not destined to that terminal and should be repeated, the IP protocol 134 passes the received data to the IP protocol 122 of the protocol send processing section 141 before feeding out the data through the send data priority deciding means 123, the send data connecting means 124, the send data fetching means 125, and the data sending means 126.

The protocol receive processing section 143 repeats the above described protocol receive process as long as the receive process queue 136 has the data connected thereto. The data receiving means 130 performs interrupt operation from the communication network even if the protocol receive processing section 143 is in operation. For the reason, the data received from the communication apparatus 111 are connected to and stored in the receive process queue 136. The receive data fetching means 133 to the protocol receive processing section 143 fetches the stored data before performing the protocol receive process.

Priority Decision Information

Figure 3:
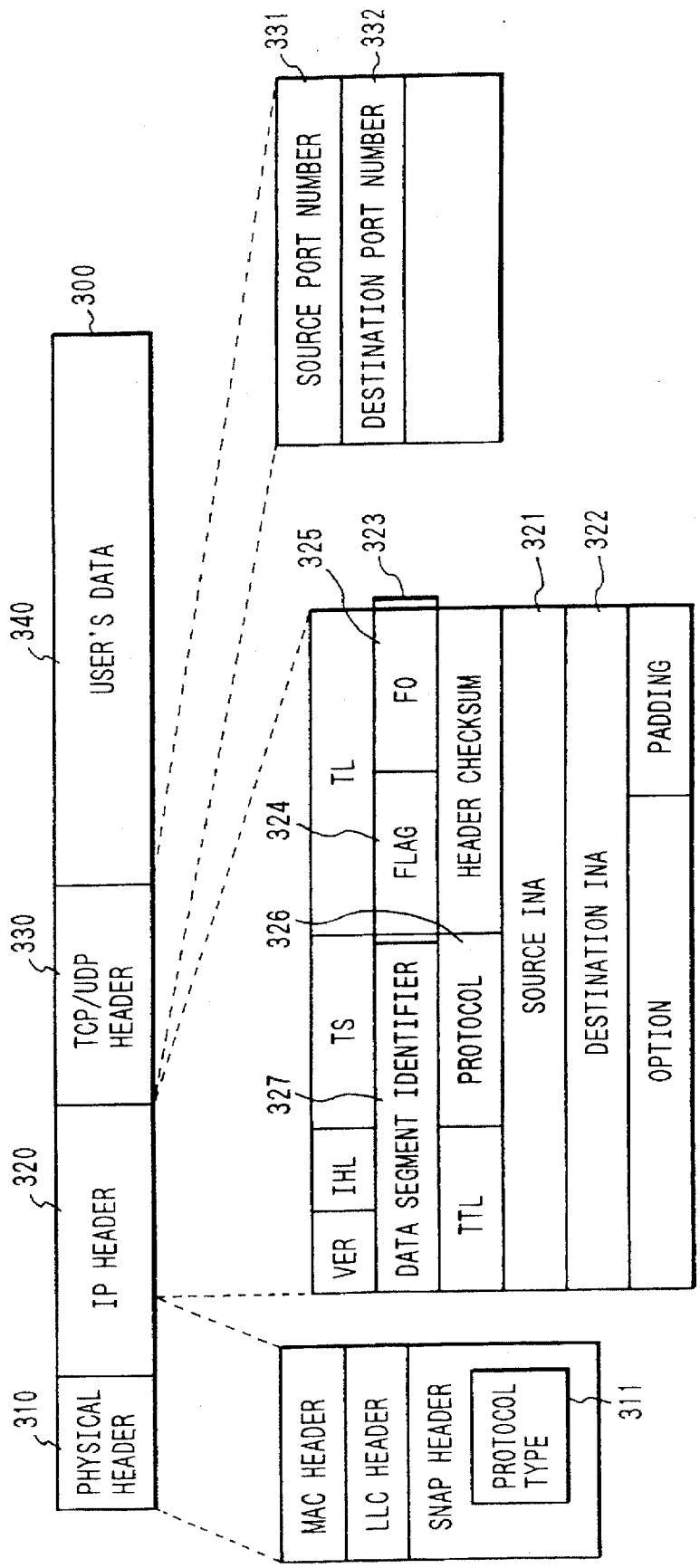
FIG. 3 depicts a format illustrating a TCP/IP data frame.

The following describes the priority decision information of the protocol header to be looked at to decide whether the receive or send data are priority or nonpriority ones. FIG. 3 depicts a format illustrating a data frame 300 flowing on the communication network. The data frame 300 is an example of TCP and IP frames with the IEEE802.3 used as data link layer. Other data link layers include the Ethernet and IEEE802 frames. The priority decision information in use with the TCP and IP protocols include a protocol type for data, a destination port number 332 and a source port number 331 of a TCP/UDP header 330, and a destination INA 322 and a source INA 321 of a source internet address (INA) 320.

A physical header 310 is formed of a MAC header, LLC (logical link control), and a SNAP (sub-network access point) of the IEEE802.3. The protocol type used is a protocol type 311 of the SNAP header of the physical header 310. The protocol type 311 has a type number and a protocol name described in a request for comment (RFC) as DARPA protocol. The IP and ARP are defined 800 and 806 in hexadecimal notation, respectively. To limit the protocol type further, a protocol 326 (high order protocol of IP) of the IP header 312 if the protocol type 311 is IP. For the protocol 326 is defined the TCP, UDP, or ICMP in RFC. For the internet address are used a source INA (internet address) 321 and a destination INA 322 of the IP header 320. For the port number are used a source port number 331 and destination port number 332 of the TCP or UDP header 330.

Figures 4, 7:
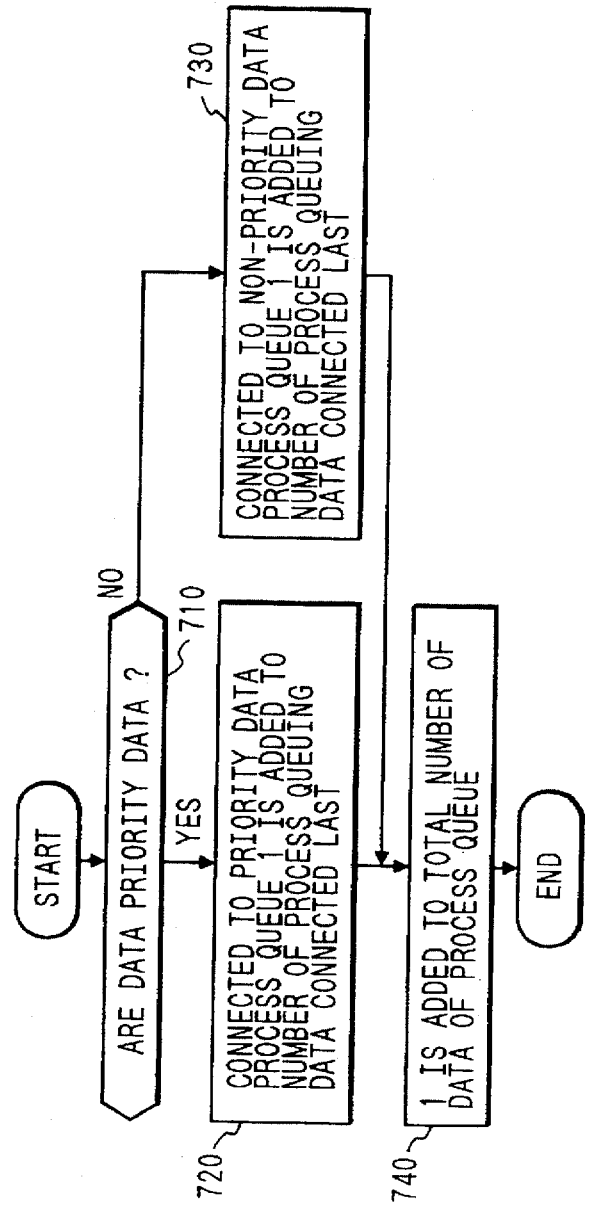
FIG. 4 is a format illustrating a priority data information registering memory of a first embodiment of the present invention.
FIG. 7 is a flow diagram illustrating a method of connecting data to the send process queue and the receive process queue in the first embodiment.

FIG. 4 depicts a format illustrating the priority data information registering memory 102 shown in FIG. 1. The priority data information registering memory 102 has combinations stored therein in which the above-mentioned priority decision information is sent or received. That is, the priority data information registering memory 102 has a protocol type 401 in the data physical header 310, a IP upper protocol 402 in the IP header, a source INA 403, a destination INA 404, a source port number 405, and destination port number 406 stored in the respective portions thereof. The protocols used include the TCP and UDP that are directly used by the communication program 120 for the communication program process and the ARP, ICMP and similar protocols that are used for the protocol process inn the system but are not directly used by the communication program. If all the protocols are registered as the priority data information, the overhead for retrieving the priority data information registering memory becomes large, delaying the communication speed. The ARP, ICMP and similar protocols that are not directly used by the communication program may be processed as priority data in advance. To make high the overhead speed for retrieving the priority data information registering memory, a hash process may be built in. It is possible to compare not all the priority decision information. If the values stored in the priority data information registering memory are 0, the items are not compared. The values may be either 0 or 1, but they have to be the ones that are not used in the priority decision information.

Priority Decision

Figure 5:
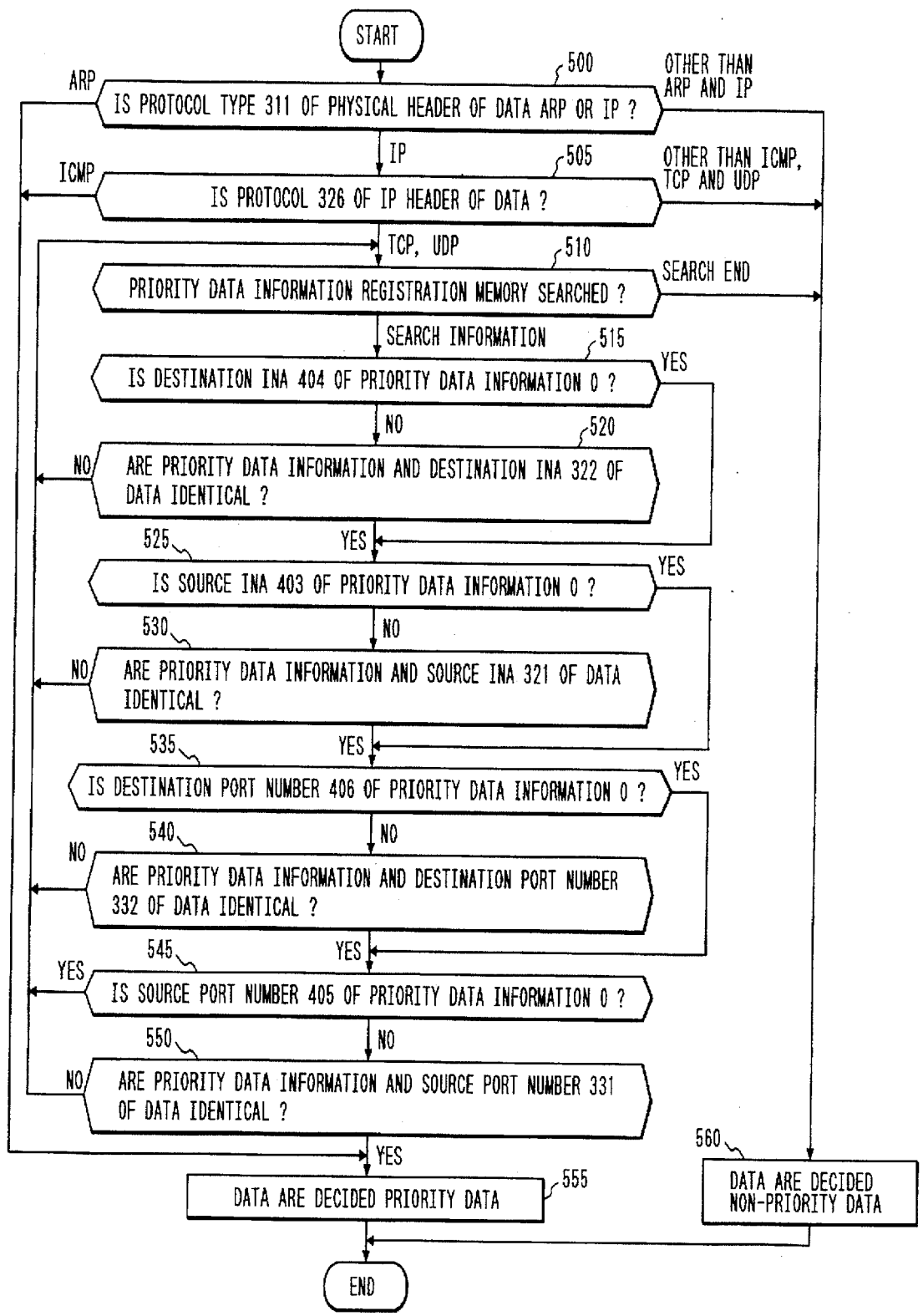
FIG. 5 is a flow diagram illustrating a data priority deciding means of the first embodiment.

FIG. 5 depicts a flow diagram illustrating an example of the send data priority deciding means and the receive data fetching means 131. In the example, steps 500 and 505 check the protocol type for the data to be sent or received. It the protocol type is ARP or ICMP, the data are treated unconditionally as priority data. If the protocol type is other than ARP, ICMP, TCP, and UDP, the data are treated as nonpriority data. If the data are TCP and UDP, steps 510 to 550 compare the data with all the destinations, source port numbers, and destination and source internet addresses in the priority data information registering memory. If the priority data information is 0, no comparison is made, but the next priority data information is compared. If registered, the data are treated as priority data. If not registered, the data are treated as nonpriority data.

Instead of steps 500 and 505, there may be inserted between steps 510 and 505 a comparison process of the protocol type 401 of the priority data information registering memory with the protocol type 311 and a comparison process of the protocol 326 with the IP upper protocol 402. If the protocol type 311 and the protocol 326 of the data header have items that coincide with those of the protocol type 401 and the IP upper protocol 402 in the priority data information registering memory, step 501 and the following steps perform the respective decisions. If no coincident items are registered, the data are decided as nonpriority data.

Process Queue Configuration

After the data undergo the above-described priority decisions above, the data are connected to the send process queue and receive process queue 136 by the send data connecting means and the receive data connecting means, respectively. Before describing methods of connecting to and fetching from the send process queue 127 and the receive process queue 136, a send or receive process queue configuration is described below.

Figure 6:
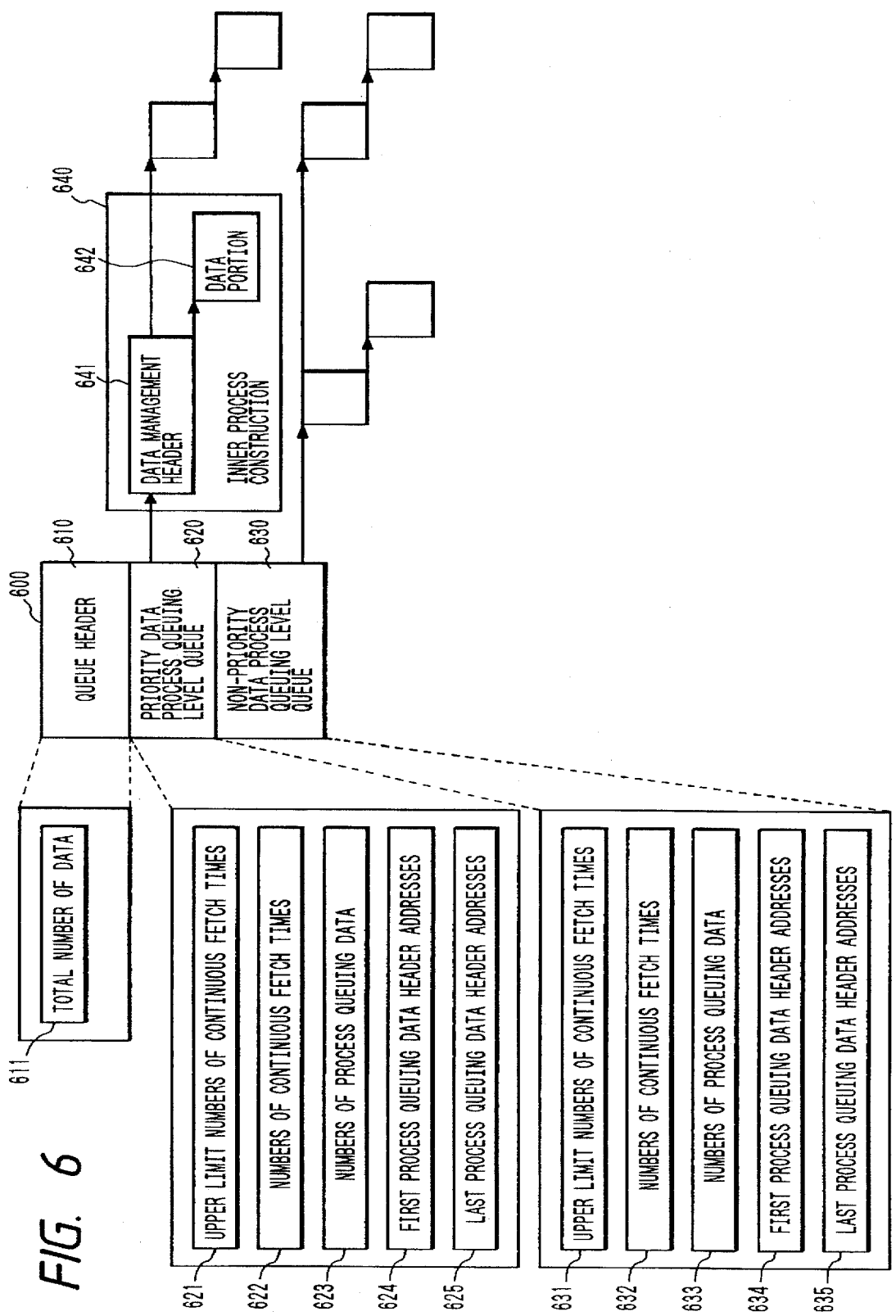
FIG. 6 is a configuration illustrating a send or receive process queue configuration of the first embodiment.

FIG. 6 depicts a configuration illustrating the send or receive process queue configuration of the first embodiment. The send or receive process queue is formed of a queue header 610 of information for use to control the send or receive data process queue, a priority data process queuing level queue 620, and nonpriority data process queuing level queue 630. The priority data process queuing level queue 620 and nonpriority data process queuing level queue 630 are identical in structure. The process queues are formed of upper limit numbers of continuous fetch times 621 and 631 that are maximum numbers of data that can be fetched continuously for the queues, current numbers of continuous fetch times 622 and 632, numbers of process queuing data 623 and 633 that count current numbers of queuing data connected with the queues, data header addresses 624 and 635 of the leading and last process queuing data of the FIFO's of the data list connected with the priority level queues, last process queuing data header addresses 625 and 635 of the FIFO's of the data list connected with the priority level queues, respectively. An internal process structure 640 of the data connected to each queue is formed of data control header 641 for storing data control information, including attributes and priority information of the data, and a data field 642.

As an example of the initial information of the process queuing described above, the total number of data 611 of the queue header 610 shown in FIG. 6 is 0.

As for the upper limit numbers of send or receive times, the upper limit numbers of priority and nonpriority process times are registered in the send and receive process upper registering file 103 put in the auxiliary storage 100. The upper limit numbers of send or receive times are stored in the upper limit number of continuous fetch times 631 of the priority data process queuing level queue 630 and the upper limit number of continuous fetch times 631 of the nonpriority data process queuing level queue 620 of the send or receive queue 600 until the data send or receive is started. As for the current numbers of continuous fetch times 622 and 632, the leading process queuing data header addresses 624 and 634, and the last process queuing data header addresses 625 and 635, they have 0 stored therein. The values other than the upper limit numbers of continuous fetch times 621 and 631 are changed by the data connection with and fetching from the process queue.

Data Connecting Method

FIG. 7 depicts a flow diagram illustrating a method of connecting data to the send process queue 127 and the receive process queue 136. Step 710 decides whether the connection data have priority or not. For the priority data, step 720 connects them next to the data indicated by the last process queuing data header address 625 of the priority data process queuing level queue 620 before adding to them 1 of the number of process queuing data 623 of the priority data process queuing level queue 620. For the nonpriority data, step 730 connects them next to the data indicated by the last process queuing data header address 625 of the nonpriority data process queuing level queue 630 before adding to them 1 of the number of process queuing data 623 of the nonpriority data process queuing level queue 630. Finally, step 740 adds to 1 to the total number of data 611 of the queue header.

Data Fetching Method

Figure 8:
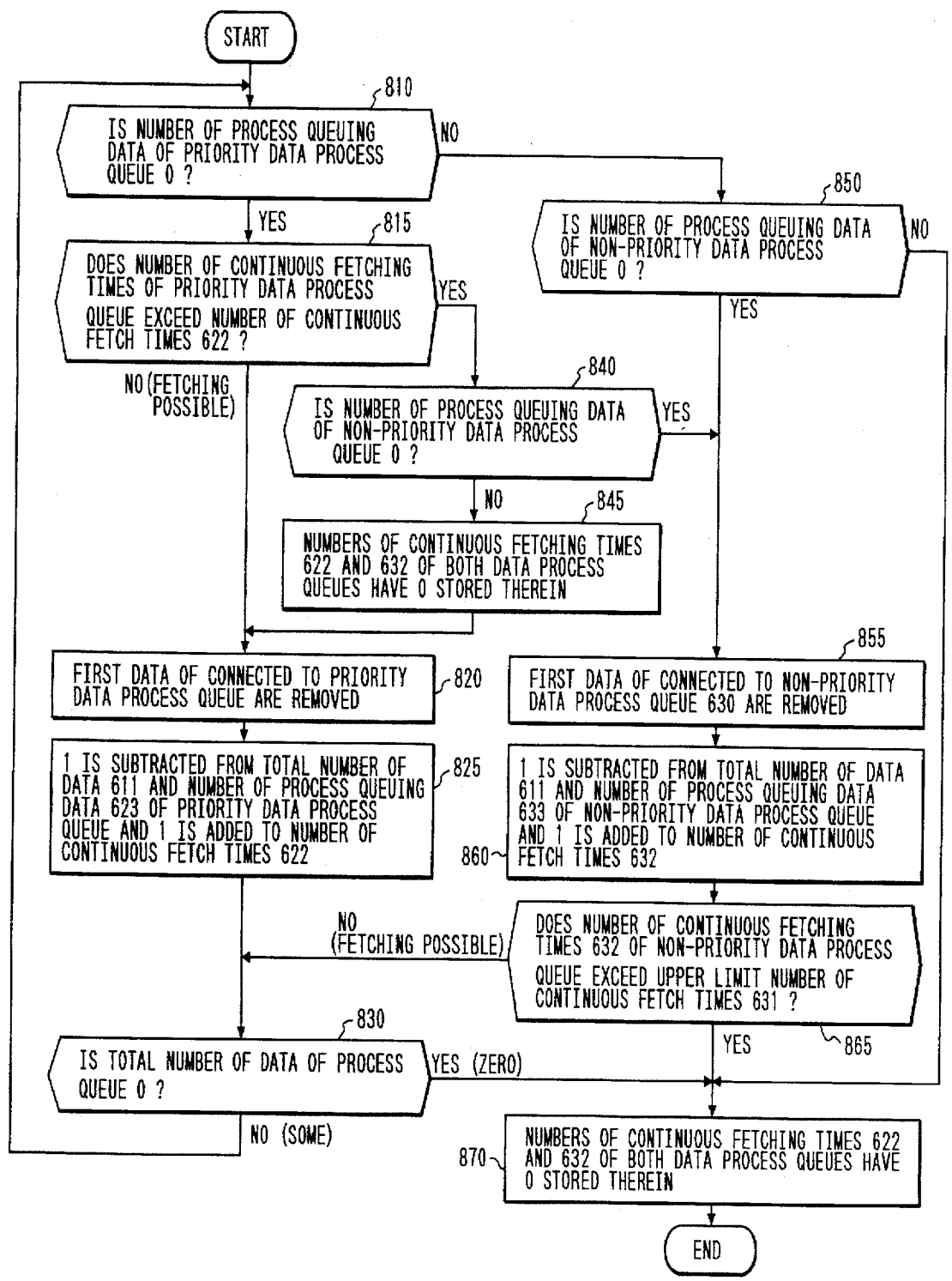
FIG. 8 is a flow diagram illustrating a method of fetching send or receive data from the send process queue or the receive process queue in the first embodiment.

FIG. 8 depicts a flow diagram illustrating a method of fetching send or receive data from the send process queue or the receive process queue 136. The method also contains a process of preventing the continuous process of priority data from making a starvation situation in which nonpriority data cannot be fetched from the send process queue or the receive process queue. The method of preventing the starvation situation shown in the flow diagram is an example of using numbers of continuous process times of priority and nonpriority data.

Steps 810 to 825 fetch data from the priority data process queuing level queue 620. Steps 850 to 860 fetch data from the nonpriority data process queuing level queue 630.

Steps 830, 840, 845, 865, and 870 makes adjustments for preventing the starvation situation. To keep the nonpriority data from the starvation situation, the upper limit numbers of continuous fetch times of the queues and the current numbers of continuous fetch times of the queues are used to count the number of continuous fetch times of the priority data with the current number of continuous fetch times. If the number of times exceeds or equals to the upper limit number of continuous fetch times, the nonpriority data are fetched out if any. The number of nonpriority data is determined by the upper limit number of fetch times of the nonpriority data process queuing level queue 630 registered.

If priority data exist as usual, steps 810 to 830 fetch the priority data out of the process queue even if nonpriority data exist. Subtractions are made from the number of process queuing data 623 and number of continuous fetch times 622 of the priority data process queuing level queue 620. Step 815 checks whether or not the number of continuous fetch times 622 of the priority data process queuing level queue 620 becomes equal to the upper limit number of continuous fetch times 621. If so, fetching the priority data is interrupted. Step 840 checks whether nonpriority data exist or not. If so, steps 855 and 860 fetch the nonpriority data. After this, step 865 decides whether or not the number of continuous fetch times 632 of the nonpriority data exceeds or equals to the upper limit number of continuous fetch times 631. If so, step 870 sets to 0 the numbers of continuous fetch times 632 and 622 of the nonpriority and priority data. The initialization of numbers of continuous fetch times in steps 845 and 870 is made when the send process queue or receive process queue has no data in steps 810, 850, and 870; when the number of continuous fetch times of the priority data reaches the upper limit number of continuous fetch times with the priority data remaining before fetching nonpriority data is tried, but no nonpriority data exist in steps 840 and 845; or when both the numbers of continuous fetch times 622 and 632 of the priority and nonpriority data become equal to the upper limit numbers of continuous fetch times in steps 865 and 870. The initialization of numbers of continuous fetch times is made at the time when no interruption of fetching the priority data is needed.

The above-described example uses integrating means for integrating the numbers of continuous fetch times and judging means for integration upper limit numbers of times that decide whether or not the integrated values exceed the upper limit numbers of continuous fetch times.

We can use an alternative method that numbers of continuous fetch times are initialized by upper limit numbers of continuous fetch times in advance before they are deducted every fetching data to decide whether they become 0 or not.

Instead of the above-described starvation situation preventive method of using numbers of continuous process times of priority and nonpriority data, we also can use the following method. Upper limit time of data capable of remaining in the auxiliary storage 100 should be registered in the send and receive process upper registering file 103 before being stored in the send process queue or receive process queue until data send or receive. The data should be connected to the send process queue or receive process queue. A latency counter of a data header of the data connected with the queue should be added every period. The data exceeding or taking time equal to the upper limit time of remaining should be fetched out of the process queue as quasi-priority data. It should be noted that fetching number of the quasi-priority data should be adjusted not to delay the original priority data, for example, one quasi-priority data for a plurality of the priority data. We further can use a data fetching method of combination of the one of numbers of times with the one of waiting time. Detailed description of these alternative methods will be given in embodiment 3 below.

Embodiment 1 of the present invention has the advantage that the data to undergo the priority send and receive processes can be discriminated with use of the protocol type, the internet address of the IP header, and the port numbers of the TCP or UDP header. The data thus can be processed with priority as required in real time in units of data sent or received by the communication program. Also, embodiment 1 has the advantage that the data can be processed with priority in units of service type in the communication system with the priority decision information formed of the port number. This can reduce the process overhead for priority decision.

EMBODIMENT 2

This and following paragraphs describe a second embodiment of the present invention.

Embodiment 1 described above uses the port numbers of the TCP or UDP header and the internet address of the IP header as the priority decision information even in the data receive. However, if the size of the send data from the TCP or UDP is larger than the maximum number of transfer bytes of a lower communication network, the send data have to be segmented and the receive data have to be reassembled. The segmented data may unavoidably contain data frames having no TCP or UDP header. That is, if the segmented data are received, it may occur that only the priority decision information shown in embodiment 1 cannot decide whether they are priority or nonpriority data. A method of avoiding such a disadvantage is described in embodiment 2.

Figure 9:
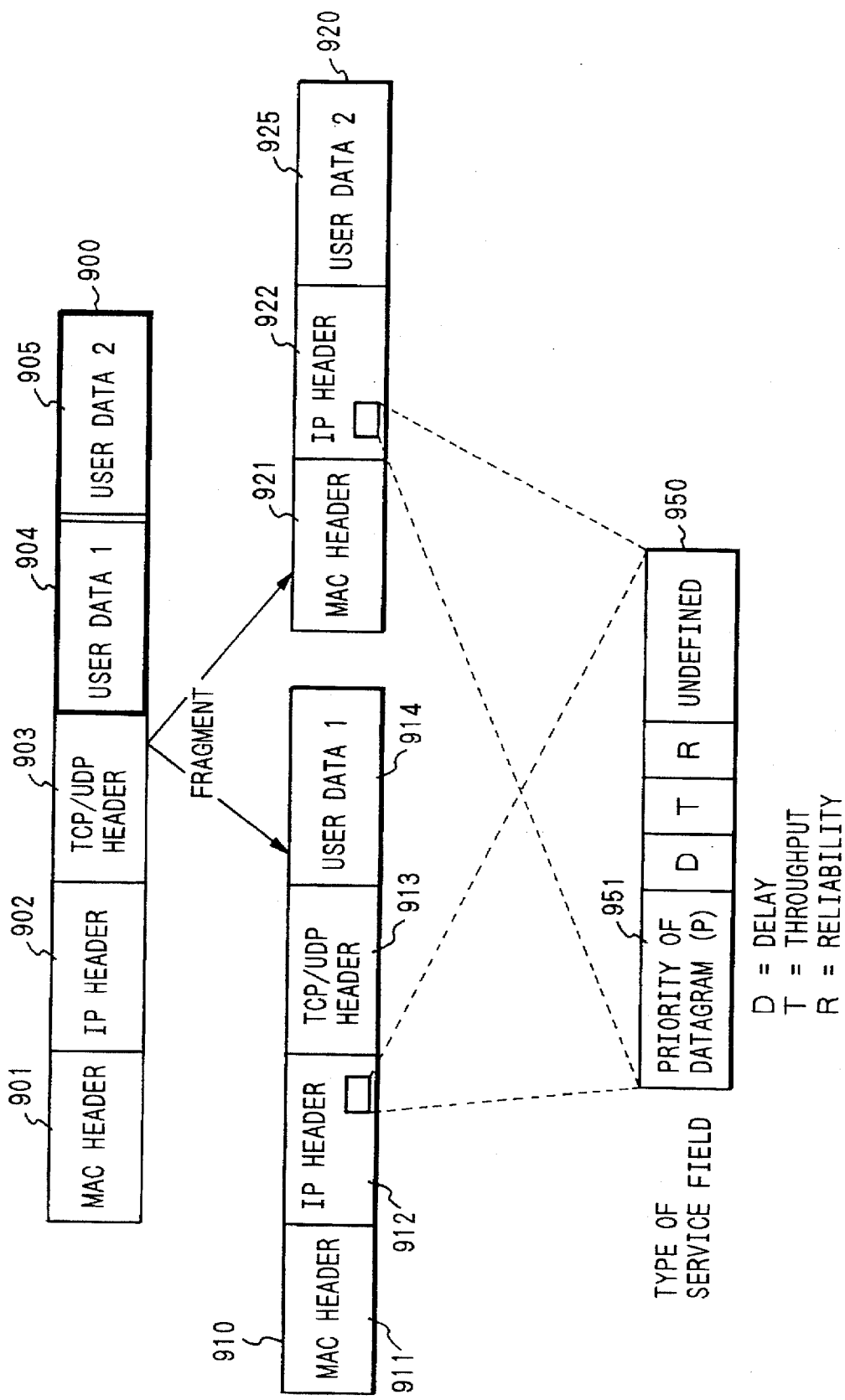
FIG. 9 is a format illustrating a segmenting process by an IP protocol in a second embodiment of the present invention.

The above-mentioned segmenting and reassembling processes are defined and known as the IP protocol. The segmented data of the send data are called the fragments in the IP protocol. FIG. 9 depicts a format illustrating the fragments. Let the IP protocol be requested to send data 900. If size of the data from an IP header 902 to user data 2 904 is larger than a maximum number of transfer bytes that a destination communication network can treat, the data are divided into, for example, two segment data 910 and 920 as shown in FIG. 9. The first data 910 have a TCP/UDP header 913 added thereto, but the second and following data have no TCP/UDP header added thereto. If data are segmented into two to send, the IP protocol is made to store the information allowing the data receive side to reassemble them into the IP headers 912 and 922 of the divided data. The data segment identifier 327, the flag 324, and fragment offset 325 shown in FIG. 3 are the information used to reassemble the data.

Embodiment 2 has the send data deciding means put before the data segmentation by the IP protocol 122 in FIG. 1, while embodiment 1 has the send data deciding means put next to the IP protocol 122. A datagram priority (P) 951 of a type of service field 950 (in FIG. 9) of the IP headers of all the data to be segmented has an identifier of priority data or not stored therein on the basis of results of the priority decision. The following priority send processes are same as in embodiment 1 except that the priority identifier is used to decide whether the data is priority data or not. The priority identifier used for the data to store is the one registered to correspond to the identification of the priority or nonpriority data by the priority decision of the send data.

The structure of data receive process is virtually the same as in embodiment 1 except that the receive data fetching means 131 in FIG. 1 is different in the method from the one in embodiment 1. That is, it is different that after recognizing that the protocol type is IP protocol, the datagram priority (P) 951 of the type of service field 950 of the IP headers is used to decide whether the data are priority ones or not. The datagram priority (P) 951, as described in the data send process, makes priority decision depending on the priority identifier that has been made to correspond to the priority or nonpriority data in advance. After the priority decision, the processes are made as in embodiment 1.

Embodiment 2 of the present invention has the advantage that the send or receive data can be discriminated to priority process or not even if the data are segmented in the internet repeater in the communication system having a plurality of lower communication networks of different maximum numbers of transfer bytes. This feature makes it possible to perform the priority control without limiting to communication equipment for use with the present invention.

Embodiment 2 described above is the example of method that the datagram priority (P) 951 of the protocol headers of the data has the priorities of the data corresponding to the priority and nonpriority data stored therein in data send operation and the priority process of data receive is made depending on the datagram priority (P) 951 of the protocol headers of the data in data receive operation. This method has to have the priority identifier set in advance to indicate whether or not the terminal is prior to the datagram priority (P) 951 of the protocol headers of the data. For the reason, if data are received and repeated from a terminal that does not perform the above-described process, it may occur that the terminal and internet repeater complying with the IP protocol cannot perform process normally or cannot make the priority decision. To avoid such an inconvenience, the data are sent as described in embodiment 1 without storing the data in the datagram priority (P) 951 of the protocol headers of the data. Then, as shown in FIG. 3, the data segment identifier 327, the fragment offset 325, and flag 324 of the IP header of the data received in advance are monitored. If they are judged as the leading data of the segmented data, the data are decided as to whether or not they should be made prior with the priority decision information. If they are prior data, they are stored for every data segment identifier. A data segment identifier has one bit allotted thereto. This makes it possible to manage whether or not they are priority data for every data segment identifier. The default is off. If the data are judged to be prior with the header information of the leading data of the segmented data, the flag of the corresponding data segment identifier is turned on. If the data are decided as the two or following data divided with the fragment offset and flag of the IP header of the received data, the data are processed as priority data if the flag corresponding to the data segment identifier of the IP header is on. The data are processed as nonpriority data if the flag is off. If the last data of the divided data are received, priority decision is made before the flag corresponding to the data segment identifier of the IP header is made off. The method described above has the advantage that the data repeated by the internet repeater can be controlled even if the data are from a terminal that does not use the process that sets the value of indicating priority or not-priority at the priority information of the protocol information.

The method also has the advantage that the priority control can be made even for a terminal and internet repeater that support the datagram priority (P) 951 defined by the IP protocol without violating the protocol.

EMBODIMENT 3

This and following paragraphs describe a third embodiment of the present invention. Embodiment 3 is an embodiment that makes priority control at more than two priority levels, while embodiments 1 and 2 are for 2-level priority control, prior or non-prior.

Embodiment 3 has the same configuration for the priority communication control in the communication system as embodiment 1 described with FIG. 1 except for formations of the priority data information registering file 101 and the priority data information registering memory 102, and formations of the priority data information registering memory 102, the send process queue 127, and receive process queue 136, and control information in the process queues. Embodiment 3 also makes different processes in view of the priority process levels in the send data priority deciding means 123 and receive data fetching means 131, the send data connecting means 124 and receive data connecting means 132, and the send data fetching means 125 and receive data fetching means 133. Embodiment 3 further uses a constant period remaining integrating means 150 as means for preventing the starvation situation at lower priority level. Embodiment 3 is same as embodiment 1 in the format of priority decision information, the process of data from the communication program to send to communication network, and the process of data received from the communication network to pass to communication program.

Figures 10, 12:
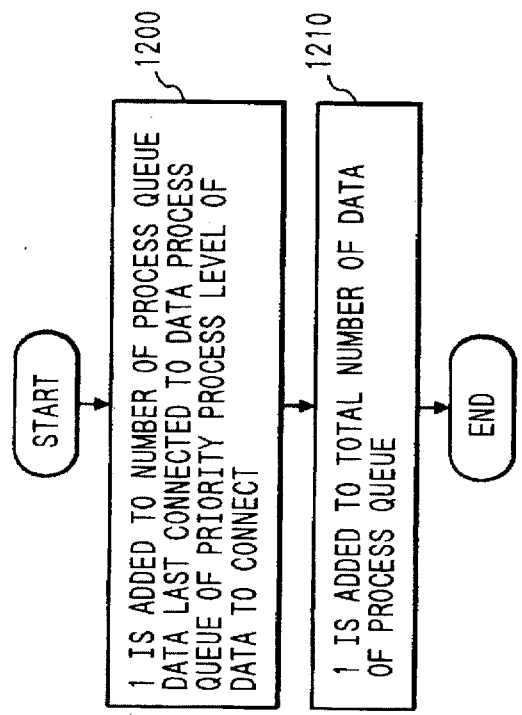
FIG. 10 is a format illustrating a priority data information registering memory of a third embodiment of the present invention.
FIG. 12 is a flow diagram illustrating a method of connecting data to the send process queue and the receive process queue in the third embodiment.

The format of priority data information used in embodiment 3 is shown in FIG. 10 that has a priority level added to the one described in embodiment 1 with FIG. 4. For the priority level of the data having the priority decision information registered in the priority data information are used the priority process level 1007 of the information coinciding with the priority decision information in FIG. 10. The priority process level 1007 is used for priority control of the following send and receive processes. If the priority data information registering memory 102 has no data priority decision information registered therein, the lowest priority process level is allotted for the send and receive processes.

FIG. 11 depicts a block diagram illustrating a configuration for the send and receive process queues with the priority level being 3. A send and receive process queues 1100 is formed of a queue header 1110 and process queues 1120, 1130, and 1140 of different priority process levels for use with the queue header 1110. The queue header 1110 is formed of a total number of data 1111 for storing a total number of the data connected with the process queue for every priority process level, a jump data list 1112, a number of priority process data 1113, and a number of jump data 1114. The jump data list 1112 is a list for sending at the highest priority the data that the constant period remaining integrating means 150 decides to be in the starvation situation since the data at lower priority level are connected to the process queue. The number of priority process data 1113 decides and registers a number of priority process levels used in the communication system in advance. Information components 1121 to 1123 of the process queue at every priority process level are same as in embodiment 1. A data structure 1140 connected with the queue also is same as in embodiment 1 except for a remaining counter 1150 at data header.

Initial values for the queue header 1110 are entered from the total number of data 1111 and the priority data information registering file 101, with 0 being in the number of jump data. A pre-registered value is stored in the number of priority process data 1113. Zero (0) is set in the number of process queuing data 1121 of the process queue of each priority level. A pre-registered value is entered to the remaining upper limit value 1123 from the send and receive process upper limit registering file 103 as initial value. The data lists of the 1110 and the priority level data process queues 1120, 1130, and 1140 are set in states having no data connected.

In FIG. 5, as for the priority decision of the send and receive data used in the priority control at the priority process level, it is made by unconditionally using data as priority data as at step 555. Instead, embodiment 3 uses a process method in which the data priority process level is the priority process level 1007 within the information in which the priority decision information of the data coincides with the priority data information registered in the priority data information registering memory in FIG. 10. For a protocol type other than ARP and IP, a protocol other than the IP protocol other than ICMP, TCP, and UDP, and data of priority decision information not registered in the priority data information registering memory (steps 500 to 510), embodiment 3 deal with the data as the ones at the lowest priority process level instead of step 560. These protocols can be registered in the priority data information registering file shown in FIG. 10 so that the priority process level can be set. After the data priority is decided, a priority process level 1151 is stored in a data header 1141 shown in FIG. 11 before being passed to connection to the data process queue. After this, the priority process level 1151 in the data header 1141 is looked at each step until the data are sent to the communication network or the receive data are passed to the communication program. The data header also has a remaining counter 1150 for integrating times of the data remaining in the system from the data send request or data reception. The remaining counter 1150 is initialized to at the data send request or data reception.

Connection of Data

The send or receive data connecting means 132 or 124 connects the send data or receive data to the send and receive process queue 1100. FIG. 12 depicts a flow diagram illustrating the data connection. Step 1200 connects the data to the last of the process queues corresponding of the data priority process level before adding 1 to the number of process queuing data of the priority level queue. Step 1210 adds 1 to the total number of data of the queue header.

Fetching of Data

Figure 13:
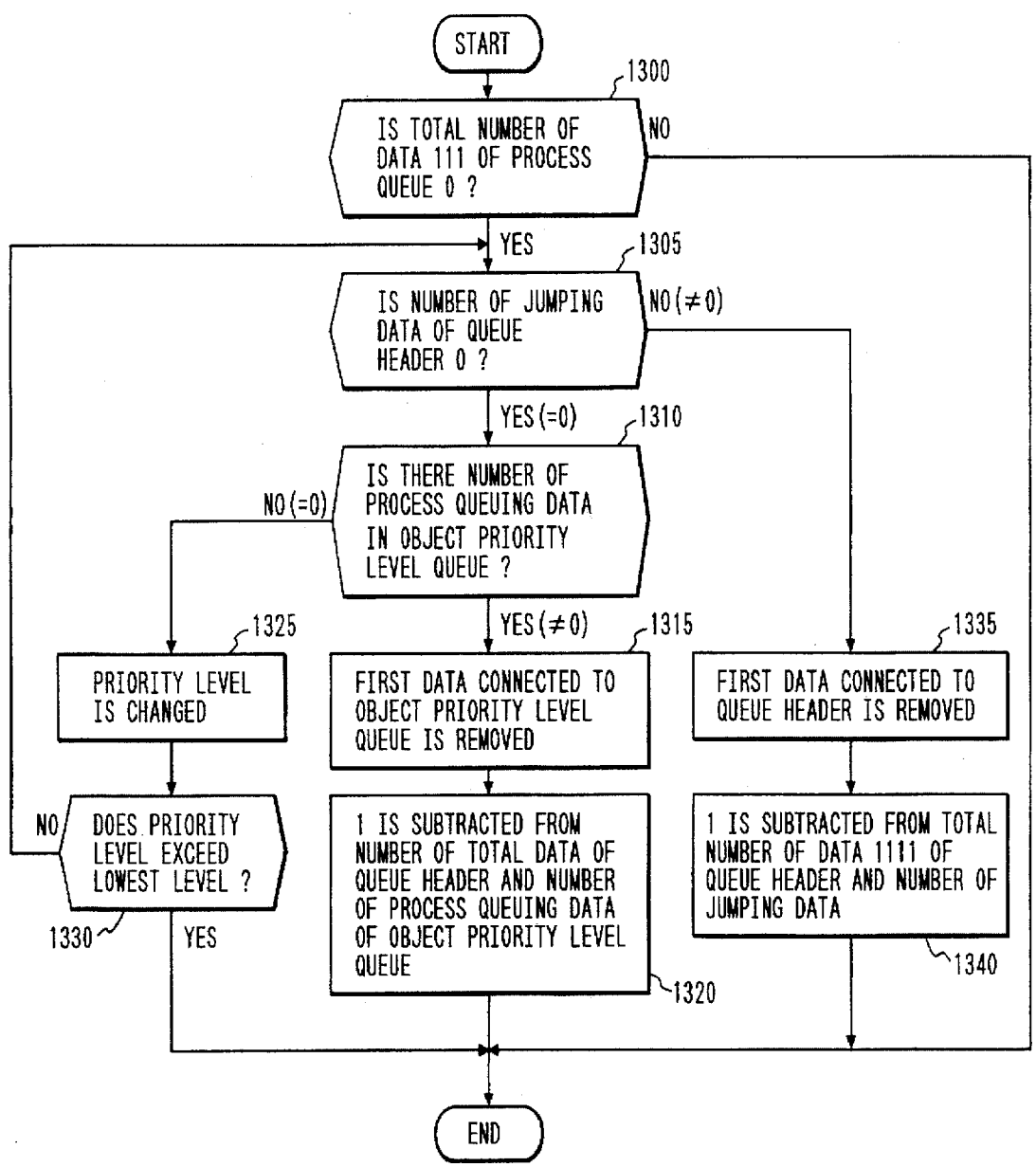
FIG. 13 is a flow diagram illustrating a method of fetching send or receive data from the send process queue or the receive process queue in the third embodiment.

In the following are described with terms of a level for the priority process level, a process queue for the send or receive process queue, and a level queue for the process queue for each priority level. FIG. 13 depicts a flow diagram illustrating a process of fetching one data from the process queue with use of the level. In the actual process, the process flow in FIG. 13 is looped times of number of the data to fetch. The following description is limited to the fetching process of one data for simplification of explanation.

Step 1300 decides with the total number of data of the queue header whether or not the data are currently connected with the process queue. If no data are connected, the process is ended as no data. If one or more data are connected, step 1305 checks whether or not the data are connected to the jump data list of the queue header when data of lower priority level is in the starvation situation. If the jump data exist, steps 1335 to 1340 disconnect the data from the queue header before subtracting 1 from the total number of data 1111 and the number of jump data 1114. Connection of the data to the jump data list 1112 is made by the constant period remaining integrating means. The constant period remaining integrating means will be described later. Steps 1305 to 1330 are usually repeated to search the data from the queue at the highest priority level to the queues at lower levels in sequence until finding the data. Step 1310 decides whether or not the current search object level queue has the data. If the process queuing data, step 1315 fetches one data before subtracting 1 from the total number of data of the process queue and the number of process queuing data of the current search object level queue. If the object level queue searched by step 1310 has no data, step 1325 changes the priority level to be searched. Step 1330 decides whether or not the resulted search priority level exceeds the lowest level. If not, search is repeated for the next level queue from step 1305. If the search priority level exceeds the lowest level, process ends as no data.

Constant Period Remaining Integrating Means

Figure 14:
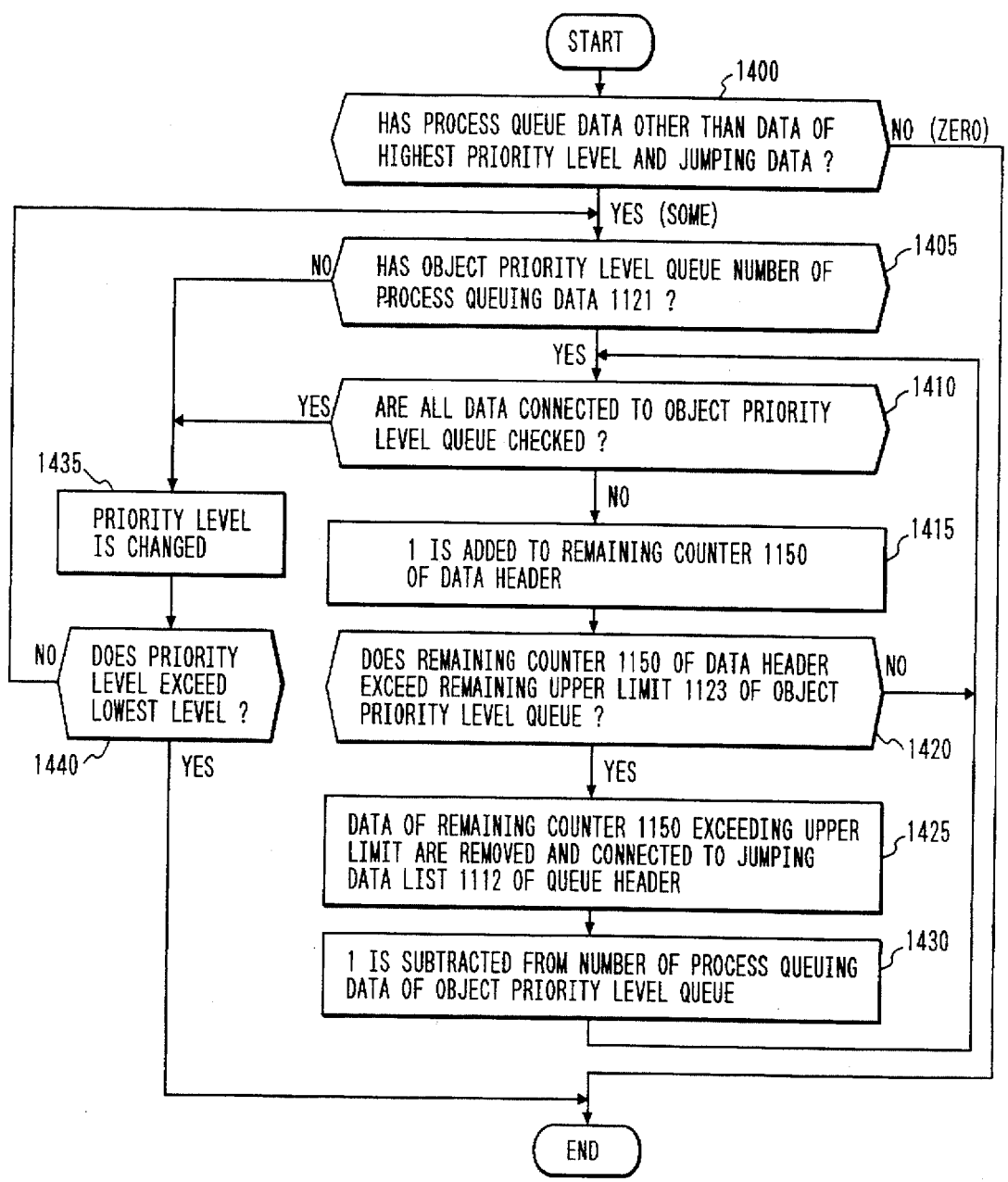
FIG. 14 is a flow diagram illustrating procedures of constant period remaining integrating means of the third embodiment.

FIG. 14 depicts a flow diagram illustrating procedures of integrating means started in constant period for integrating times of data connected to and remaining in the process queue. The process is started in a pre-registered constant period of time to execute the steps shown in the flow diagram of FIG. 14. Step 1400 decides whether or not there are data other than the process queuing data of the highest priority level queue the process queue and the jump data of the queue header. If no, process ends. If there are data other than the highest priority data and the jump data, steps 1405 to 1420 are repeated from the queue at the priority level next lower than the highest priority level to the one at the lowest level in sequence before adding 1 to remaining counter 1150 of the data header of the all the process queuing data. If the addition result exceeds or equals to the remaining upper limit value 1123 of the level queue of the data, step 1420 decides that the data are in the starvation situation. Steps 1425 to 1430 disconnect the data from the level queue before connecting to the last of the jump data list 1112 of the queue header and subtracting 1 from the number of process queuing data 1121.

As described so far, embodiment 3 has the advantage that a plurality of priority process levels are used to make it possible to process in priority order the data to be send- or receive processed in real time. Embodiment 3 also has the advantage that since the constant period remaining integrating means is used, the send and receive processes of lower priority data that cannot be interrupted completely even with high priority data occurring continuously can avoid congestion of the communication network due to unnecessary re-sending process and disconnection of the logic line.

EMBODIMENT 4

This and following paragraphs describe a fourth embodiment of the present invention. Embodiment 3 may not fetch the priority decision information for the segmented data described in embodiment 2 so that priority cannot be decided. Embodiment 4 uses a communication method by way of the plurality of priority process levels of embodiment 3 with the priority control method for the segmented and reassemble data described in embodiment 2 introduced therein.

Embodiment 4 has the send data priority deciding means 123 put before the IP protocol 122 for segmenting data, while embodiment 3 has the send data priority deciding means 123 behind the IP protocol 122 as in FIG. 1. The priority process level obtained by the send data priority deciding means 123 is stored in the datagram priority (P) 951 of the type of service field 950 in FIG. 9 of the IP header of all the data to segment. The following priority send processes are same as in embodiment 3. The priority to be stored may be either of the priority process level or a value to which the priority level is converted by a priority conversion table, but the storing the priority should be standardized in the communication system. The structure of data receive process is virtually the same as in embodiment 3 except that the receive data fetching means 131 in FIG. 1 is different in the method from the one in embodiment 3. That is, it is different that after recognizing that the protocol type is IP protocol, the datagram priority (P) 951 of the type of service field 950 of the IP headers is used to decide whether the data are priority ones or not. The datagram priority (P) 951, as described in the data send process, makes priority decision depending on the priority in the IP header that has been made to correspond to the priority process level in advance. After the priority decision, the processes are made as in embodiment 3.

Embodiment 4 of the present invention has the advantages of embodiment 3 as it is allowed for segmented data. In addition, it can be applied to the communication system formed of a plurality of different communication networks. Embodiment 4 described above is the example of a method that in the data send mode, the priority process level is stored in the priority information of the protocol header of data and in the data receive mode, data are priority-controlled according to the priority information of the protocol header of data. In the method, a terminal has to set the process level prior to the priority information of the protocol header of data in advance. For the reason, if a terminal receives and repeats data from another terminal that cannot perform such a process, it involves a problem that the priority process level cannot be decided. To avoid the problem, the terminal should send data without storing the priority information of the protocol header of the data. The terminal also monitors the data segment identifier, the fragment offset, and the flag of the IP header of the data in advance. If the data are judged as the leading segmented data, they are decided to be made prior or not with the priority decision information. If so, the data are stored for every data segment identifier. The terminal then controls a table that makes the received data segment identifiers correspond to the priority process levels. The initial values are made 0. The priority process level is decided with the header information of the leading segmented data. The data segment identifier and the priority process level are stored. If the data are judged as the second or subsequent data with the fragment offset and the flag of the IP header of the received data, the data are sent or received at the priority process level if the data segment identifier of the IP header is stored in the table. If the data segment identifier is not stored in the table although the data are segmented data, it is regarded that the leading data do not come yet or have been abandoned. The data then undergo the send or receive process at the priority process level registered in advance. If the leading data come afterward, their segment identifier and priority process level are stored in the table. If the last segmented data are received, they undergo the priority decision before their segment identifier and priority process level are deleted from the table. The table is managed in a hashed, high-speed method of retrieval, registration, and deletion. The method allows priority control for the data repeated through the internet repeater from terminals of different configurations at priority process levels.

As described so far, embodiment 4 has the advantage that as it can decide the send or receive process orders of data in the communication system having mixed data of such data as multimedia and plant data required to be processed in real time and data that may be delayed to some degree, the data can be priority-controlled without providing limits of communication for each of the data treated by application communication programs. The embodiment also can set the priority process level in units of communication data without providing limits of communication for the application communication programs. The embodiment further can be applied to network repeaters for repeating data through a plurality of communication networks of different types since it can provide priority control even for the data having no service identifier at the protocol header thereof. The embodiment further more has the advantage that the send and receive processes of lower priority data that cannot be interrupted completely even with high priority data occurring continuously can avoid congestion of the communication network due to unnecessary re-sending process and disconnection of the logic line.

The present invention can achieve priority control without providing limits of communication for each of the data treated by application communication programs.

The present invention can achieve priority control in the communication system containing network repeaters.

The present invention can achieve that send and receive processes of lower priority data that cannot be interrupted completely even with high priority data occurring continuously can avoid congestion of the communication network due to unnecessary resending process and disconnection of the logic line.

What is claimed:

1. A communication system having a plurality of terminals connected through communication networks and using protocols for sending or receiving data, comprising:

means for making use of priority decision information for deciding the data to be subjected to priority send or receive process, wherein said information is protocol header information in the send or receive data;

means for registering as priority data information priority decision information of the data to be sent or received with priority;

means for fetching priority decision information from the send or receive data before deciding whether or not the data are registered as the priority decision information; and, sending or receiving means for making the send or receive process of the data registered as the priority decision information prior to data being not registered;

wherein the priority decision information comprises one of the following, a service identifier and a network address of the protocol header information and a protocol type of the protocol header information.

2. The communication system according to claim 1, further comprising:

means for registering upper limit numbers of times in which the data to be priority-processed can be continuously send- and receive-processed;

means for integrating a number of times of consecutive priority send or receive processes since occurrence of a send or receive process request of data to be nonpriority-processed;

means for deciding whether or not the number of times of the consecutive priority send or receive processes integrated by the integrating means is the registered upper limit number of times; and, means for making prior send or receive process of a registered number of the queuing nonpriority data for more than the upper limit number of times before clearing the integrated number of times.

3. The communication system according to claim 1, further comprising:

means for registering as initial numbers upper limit numbers of times in which the data to be priority-processed can be continuously send- and receive-processed;

means for subtracting from the initial number a number of times of consecutive priority send or receive processes since occurrence of a send or receive process request of data to be nonpriority-processed; and, means for making prior send or receive process of a registered number of the queuing nonpriority data if a result of the subtraction becomes zero.

4. The communication system according to claim 1, further comprising:

means for registering upper limit time for which data to be nonpriority-processed can remain in the system;

means for periodically counting time of the nonpriority data remaining in the system since occurrence of a send or receive process request of the nonpriority data;

means for deciding whether or not the time counted by the remaining time counting means is longer than the registered upper limit time; and, means for making prior send or receive process of the nonpriority queuing data if the time counted by the remaining time counting means is longer than the registered upper limit time.

5. A communication system having a plurality of terminals connected through communication networks and using protocols for sending or receiving data, comprising:

means for segmenting the send data into at least leading data and second and following data;

means for deciding whether the received data are priority data or not by use of priority decision information of a protocol header of the segmented leading data;

means for storing a table having data segment identifiers of headers of receive data made to correspond to priority or not;

means for deciding with said table whether or not the data segment identifier of the received second or the following segmented data is of priority; and, means for priority-controlling a send or receive process depending on decision results of the table decision means;

wherein the priority decision information comprises one of the following, a service identifier and a network address of the protocol header information and a protocol type of the protocol header information.

6. A communication system as defined in claim 5 wherein:

a protocol header of the data has priorities of priority data and nonpriority data stored in the priority decision information thereof and the data send or receive process is priority controlled according to the priority information.

7. A communication system having a plurality of terminals connected through communication networks and using protocols for sending or receiving data, comprising:

means for making use of priority decision information for deciding the data to be subjected to prior send or receive process as protocol header information in the send or receive data;

means for registering as priority data information priority decision information of the data to sent or received with priority, the priority decision information having a priority process level added thereto as priority process order;

means for fetching priority decision information from the send or receive data before deciding whether or not the data are registered as the priority decision information, the data being processed to send to or received from the communication network; and, means for making priority control of send or receive process of the registered data at the registered priority process level of the priority data information or unregistered data at a priority process level registered in advance;

wherein the priority decision information comprises one of the following, a service identifier and a network address of the protocol header information and a protocol type of the protocol header information.

8. A communication method in a system having a plurality of terminals connected through communication networks and using protocols for sending or receiving data, comprising the steps of:

making use of priority decision information for deciding the data to be subjected to prior send or receive process as protocol header information in the send or receive data;

registering as priority data information priority decision information of the data to sent or received with priority;

fetching priority decision information from the send or receive data before deciding whether or not the data are registering as the priority decision information; and, making the send or receive process of the data registered as the priority decision information prior to data being not registered;

wherein the priority decision information comprises one of the following, a service identifier and a network address of the protocol header information and a protocol type of the protocol header information.

9. A communication method as defined in claim 8, further comprising the steps of:

registering upper limit numbers of times in which the data to be priority-processed can be continuously send- and receive-processed;

integrating number of times of consecutive priority send or receive processes since occurrence of a send or receive process request of data to be nonpriority-processed;

deciding whether or not the number of times of the consecutive priority send or receive processes integrated by the integrating means is the registered upper limit number of times; and making prior send or receive process of a registered number of the queuing nonpriority data for more than the upper limit number of times before clearing the integrated number of times.

10. A communication method as defined in claim 8, further comprising the steps of:

registering as initial numbers upper limit numbers of times in which the data to be priority-processed can be continuously send- and receive-processed;

subtracting from the initial number integrating number of times of consecutive priority send or receive processes since occurrence of a send or receive process request of data to be nonpriority-processed; and making prior send or receive process of a registered number of the queuing nonpriority data if a result of the subtraction becomes zero.

11. A communication method as defined in claim 8, further comprising:

registering upper limit time for which data to be nonpriority-processed can remain in the system;

periodically counting time of the nonpriority data remaining in the system since occurrence of a send or receive process request of the nonpriority data;

deciding whether or not the time counted by the remaining time counting means is longer than the registered upper limit time; and making prior send or receive process of the nonpriority queuing data if the time counted by the remaining time counting means is longer than the registered upper limit time.

12. A communication method according to claim 8 wherein the priority process level is stored in a priority information field of a protocol header of the data at sending the data before a data sending process is controlled according to the priority information, or a data receiving process is controlled according to the priority information of the protocol header of the data.

13. A communication method in a system having a plurality of terminals connected through communication networks and using protocols for sending or receiving data, comprising the steps of:

segmenting the send data into at least leading data and second and following data;

deciding whether the received data are priority data or not by use of priority decision information of a protocol header of the segmented leading data;

storing a table having data segment identifiers of headers of receive data made to correspond to priority or not;

deciding with the table whether or not the data segment identifier of the received second or the following segmented data is of priority;

priority-controlling a send or receive process depending on the decision; and wherein the priority decision information comprises one of the following, a service identifier and a network address of the protocol header information and a protocol type of the protocol header information.

14. A communication method as defined in claim 13 wherein:

a protocol header of the data has priorities of priority data and nonpriority data stored in a priority information thereof and the data send or receive process is controlled according to the priority information.

15. A communication method in a system having a plurality of terminals connected through communication networks and using protocols for sending or receiving data, comprising the steps of:

making use of priority decision information for deciding the data to be subjected to prior send or receive process as protocol header information in the send or receive data;

registering as priority data information priority decision information of the data to be sent or received with priority among the priority decision information in advance as priority data information, the priority decision information having a priority process level added thereto as priority process order;

fetching priority decision information from the send or receive data before deciding whether or not the data are registered as the priority decision information, the data being processed to send or to received from the communication network;

making priority control of send or receive process of the registered data at the registered priority process level of the priority data information or unregistered data at a priority process level registered in advance; and wherein the priority decision information comprises one of the following, a service identifier and a network address of the protocol header information and a protocol type of the protocol header information.

16. A communication method as defined in claim 15, further comprising the steps of:

registering upper limit time by level of the data to be send- or receive-processed for which the data can remain in the system;

periodically counting time of the data remaining in the system since occurrence of a send or receive process request of the data;

deciding whether or not the time counted by the remaining item counting means is longer than the registered upper limit time; and changing the data to a priority process level registered in advance before making send or receive process of the data if the time counted by the remaining time counting means exceeds the upper limit time.

17. The communication method as defined in claim 15, further comprising the steps of:

segmenting the send data into at least leading data and second and following data;

deciding whether the received data are priority data or not by use of priority decision information of a protocol header of the segmented leading data;

storing a table having data segment identifiers of headers of receive data made correspond to the priority levels;

deciding with the table the priority level of the data segment identifier of the received second of the following segmented data; and priority-controlling a send or receive process depending on decision results of the table decision using the table.

* * * * *